US012574639B2

(12) United States Patent (10) Patent No.: US 12,574,639 B2
Wali et al. (45) Date of Patent: Mar. 10, 2026

(54) AUTOMATED CAMERA GIMBAL

(71) Applicant: Carvana, LLC, Tempe, AZ (US)

(72) Inventors: Alexandre Wali, Atlanta, GA (US);
Bruno Francois, Atlanta, GA (US);
Remy Cilia, Atlanta, GA (US); **Alan
Melling, Atlanta, GA (US); Antoine
Vaucamps**, Atlanta, GA (US)

(73) Assignee: Carvana, LLC, Tempe, AZ (US)

( * ) Notice: Subject to any disclaimer, the term of this
patent is extended or adjusted under 35
U.S.C. 154(b) by 153 days.

(21) Appl. No.: 18/484,294

(22) Filed: Oct. 10, 2023

(65) Prior Publication Data

US 2025/0119645 A1     Apr. 10, 2025

(51) Int. Cl.
H04N 23/68 (2023.01)
G03B 17/56 (2021.01)
H04N 23/60 (2023.01)

(52) U.S. Cl.
CPC .......... H04N 23/68 (2023.01); G03B 17/561
(2013.01); H04N 23/64 (2023.01)

(58) Field of Classification Search
None
See application file for complete search history.

(56) References Cited

U.S. PATENT DOCUMENTS 6,304,284 B1     10/2001   Dunton et al.
7,348,989 B2     3/2008    Stevens et al.
7,912,319 B2     3/2011    Lakshamanan et al.
8,212,812 B2     7/2012    Tsin et al.
9,659,381 B2     5/2017    Mullins et al.
9,928,655 B1     3/2018    Alston
10,284,794 B1 *  5/2019    Francois ................... G06T 7/33
11,373,318 B1 *  6/2022    McKennoch .......... G06V 20/52
11,727,657 B2    8/2023    Melling et al.
11,776,229 B2 *  10/2023   Holzer ................ H04N 23/698
                                                        345/619
11,810,262 B2    11/2023   Melling et al.
12,015,843 B1 *  6/2024    Imai .......................... G06T 7/60
2003/0117497 A1  6/2003    Nicolaisen et al.
2006/0269264 A1  11/2006   Stafford et al.
2007/0263995 A1  11/2007   Park et al.
2010/0127819 A1  5/2010    Radivojevic et al.
2010/0214398 A1  8/2010    Goulart et al.
2011/0104941 A1  5/2011    Chang et al.
2011/0187323 A1  8/2011    Gourley
2012/0038636 A1  2/2012    Montague (Continued)

OTHER PUBLICATIONS

Screen captures from YouTube video clip entitled "I Phone & I Pod
Easy stand from a charger plug." 4 pages, uploaded on Aug. 1, 2014
by user "grouse201 O". Retrieved from Internet: <https://www.
youtube.com/watch?v=SZQI7ItD2L8>.

(Continued)

*Primary Examiner* — Rodney E Fuller
(74) *Attorney, Agent, or Firm* — SNELL & WILMER
L.L.P.

(57) ABSTRACT

The method includes capturing a first portion of a surround
image using a camera; generating a bounding box using an
image in the first portion of the surround image; estimating
a center of an item in the image using the bounding box; and
adjusting a position of a motorized gimbal such that the
motorized gimbal focuses on the center of the item.

20 Claims, 4 Drawing Sheets

400

(56) References Cited

U.S. PATENT DOCUMENTS

| | | | |
|---|---|---|---|
| 2012/0062691 A1 | 3/2012 | Fowler et al. | |
| 2012/0293683 A1 | 11/2012 | Osaka et al. | |
| 2012/0300019 A1 | 11/2012 | Yang et al. | |
| 2012/0306999 A1 | 12/2012 | Zhou | |
| 2012/0320148 A1* | 12/2012 | Unger | H04N 23/698 |
| | | | 348/36 |
| 2013/0084773 A1 | 4/2013 | Mimlitch et al. | |
| 2013/0181098 A1 | 7/2013 | Lin | |
| 2014/0028713 A1 | 1/2014 | Keating et al. | |
| 2014/0117193 A1 | 5/2014 | Wong | |
| 2015/0188591 A1 | 7/2015 | Shen et al. | |
| 2017/0061229 A1* | 3/2017 | Rastgar | G06T 7/248 |
| 2017/0193687 A1 | 7/2017 | Lo et al. | |
| 2017/0206691 A1 | 7/2017 | Harrises et al. | |
| 2019/0065027 A1 | 2/2019 | Hauenstein et al. | |
| 2020/0059595 A1* | 2/2020 | Ono | H04N 23/695 |
| 2020/0320727 A1 | 10/2020 | Smolic et al. | |
| 2021/0250490 A1* | 8/2021 | Miao | H04N 23/675 |
| 2022/0189124 A1 | 6/2022 | Sanor et al. | |
| 2022/0277512 A1* | 9/2022 | Ito | G06T 17/20 |
| 2022/0284662 A1 | 9/2022 | Bond | |
| 2023/0252649 A1* | 8/2023 | Lu | G06V 10/62 |
| | | | 382/103 |

OTHER PUBLICATIONS

Wikipedia. "File: Image explaining how Cycloramic iPhone app Works.png." Retrieved Jul. 30, 2013. 5 pages.

* cited by examiner

100

200

400

AUTOMATED CAMERA GIMBAL

TECHNICAL FIELD

This disclosure generally relates to photography, and more specifically, to automated gimbals for use in photography.

BACKGROUND

Camera stabilization is important to the film and photography industries. Without adequate stabilization, photographs and videos may be blurry and/or may be of low quality. Blurry and/or low quality photos, in turn, can lead to problems with downstream uses for these photos (e.g., sale of an item online, generation of an AR/VR scene, generation of a surround image, training of a predictive algorithm, etc.).

A number of technologies have been used in attempts to solve the stabilization problem. One such technology involves camera stabilizers or a camera-stabilizing mount. These mechanical devices are designed to hold a camera in a manner that prevents or compensates for unwanted camera movement. However, stabilizers are often operated by humans such that the ability of the stabilizer to stabilize an image can be hampered due to inaccuracies and anomalies in human movement. For example, a person walking around an item to capture images may often not walk in a perfect circle, and any un-stabilized surround image may typically be blurry and/or of low quality. Therefore, in view of the above, there is a need for a new stabilizer that automates its movements to produce a stabilized final product.

BRIEF DESCRIPTION OF THE DRAWINGS

To facilitate further description of the embodiments, the following drawings are provided in which.

Figure 1:
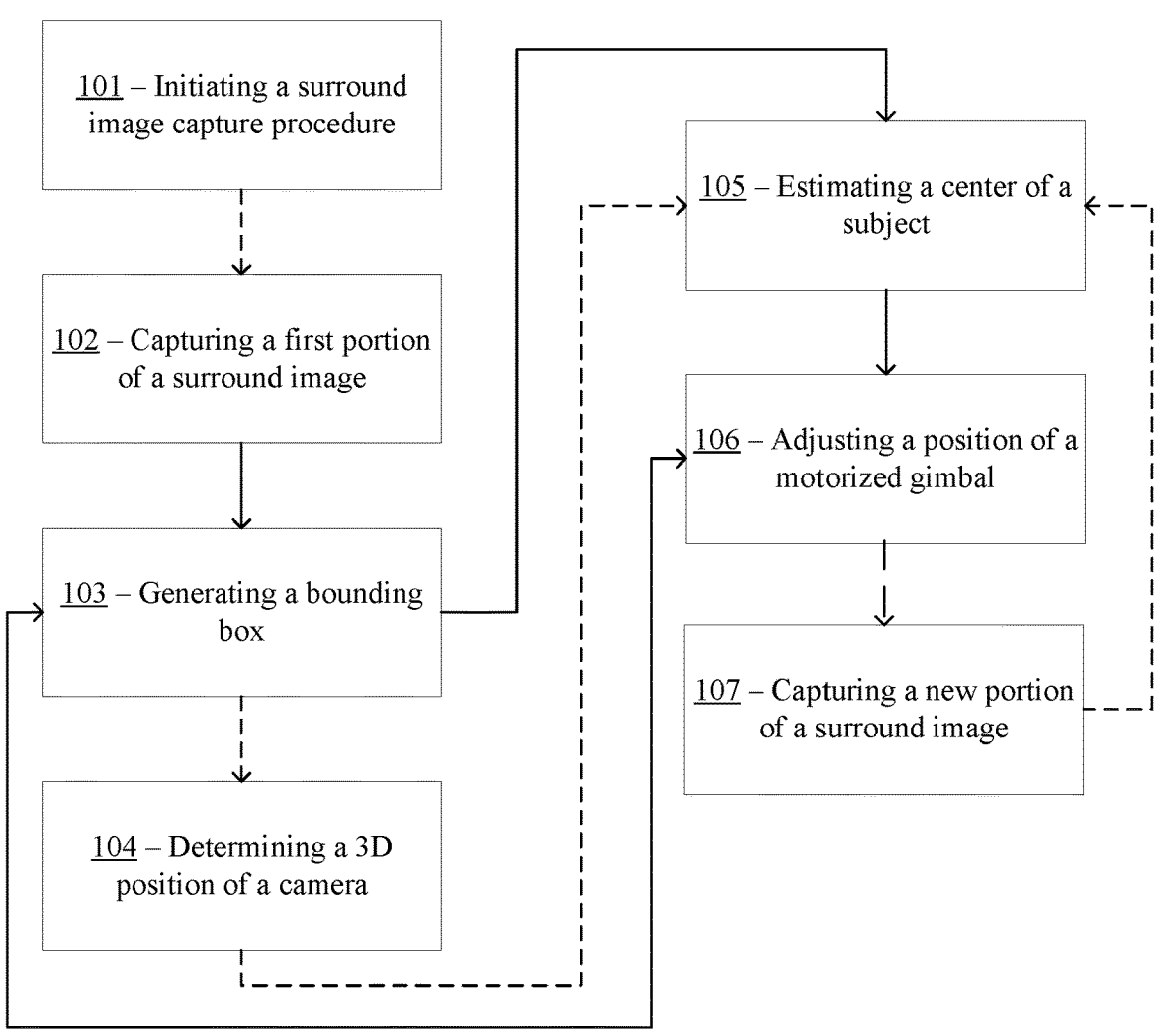
FIG. 1 illustrates an exemplary flowchart for a method, according to various embodiments.

For simplicity and clarity of illustration, the drawing figures illustrate the general manner of construction, and descriptions and details of some features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in various embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in various embodiments, the time delay can be less than approximately one second, two seconds, five seconds, or ten seconds.

As defined herein, "approximately" can, in various embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

In various embodiments, the system can include one or more processors and one or more non-transitory computer-readable storage devices storing computing instructions. The computing instructions can be configured to run on the one or more processors and cause the one or more processors to perform capturing a first portion of a surround image using a camera; generating a bounding box using an image captured in the first portion of the surround image; estimating a center of an item in the image using the bounding box; and adjusting a position of a motorized gimbal such that the motorized gimbal focuses on the center of the item.

In various embodiments, the method can comprise capturing a first portion of a surround image using a camera; generating a bounding box using an image captured in the first portion of the surround image; estimating a center of an item in the image using the bounding box; and adjusting a position of a motorized gimbal such that the motorized gimbal focuses on the center of the item.

In various embodiments, the article of manufacture can comprise a non-transitory, tangible computer readable storage medium having instructions stored thereon that, in response to execution by a computer based system, cause the computer based system to perform operations comprising: capturing a first portion of a surround image using a camera; generating a bounding box using an image captured in the first portion of the surround image; estimating a center of an item in the image using the bounding box; and adjusting a position of a motorized gimbal such that the motorized gimbal focuses on the center of the item.

In various embodiments, the techniques described herein can provide a practical application and several technological improvements. In various embodiments, the techniques described herein can provide for an improved and/or higher quality surround image. The techniques described herein can provide a significant improvement over conventional approaches, such as a manual gimbal. The techniques described herein can avoid problems with shaky and/or blurry images by stabilizing a camera.

Figure 2:
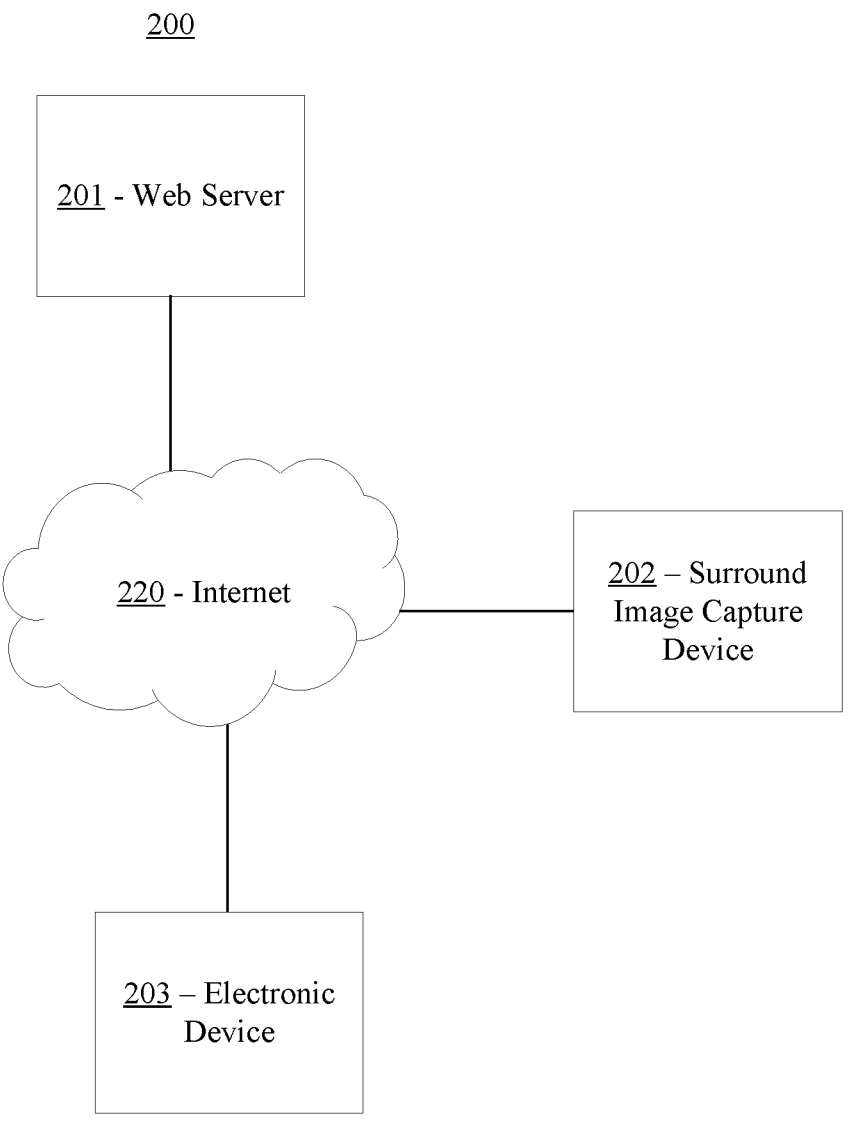
FIG. 2 illustrates a representative block diagram of a system, according to various embodiments.

FIG. 1 illustrates a flow chart for a method 100, according to various embodiments. Method 100 is merely exemplary and is not limited to the embodiments presented herein. Method 100 can be employed in many different embodiments or examples not specifically depicted or described herein. In various embodiments, the activities of method 100 can be performed in the order presented. In other embodiments, the activities of method 100 can be performed in any suitable order. In still other embodiments, one or more of the activities of method 100 can be combined or skipped. In various embodiments, system 300 (FIG. 3) can be suitable to perform method 100 and/or one or more of the activities of method 100. In these or other embodiments, one or more of the activities of method 100 can be implemented as one or more computer instructions configured to run at one or more processing modules and configured to be stored at one or more non-transitory memory storage modules. Such non-transitory memory storage modules can be part of a computer system such as web server 201 (FIG. 2), surround image capture device 202 (FIG. 2), and/or electronic device 203 (FIG. 2). The processing module(s) can be similar or identical to the processing module(s) described above with respect to computer system 300 (FIG. 3).

In various embodiments, method 100 can comprise an activity 101 of initiating a surround image capture procedure. In other embodiments, activity 101 can be skipped. For example, all or a portion of activity 101 can be skipped in response to images used in method 100 being captured by a third party. A surround image can comprise a type of panoramic image that captures a view of a subject (e.g., an automobile, product, person, scene, etc.) from multiple angles. In various embodiments, a surround image can create a seamless view of the subject from the multiple angles. If a sufficient number of images have been captured, a surround image can display the subject from all directions and viewpoints. Surround images can be used in virtual reality (VR) and/or altered reality (AR) scenes, thereby offering users a more immersive experience that integrates elements of real world objects.

A surround image capture procedure can compromise one or more fully and/or partially computerized algorithms for capturing a surround image. A surround image capture procedure can take a number of different forms. In various embodiments, initiating a surround image capture procedure can comprise activating an automated photography studio configured to capture a surround image. For example, U.S. Pat. No. 10,939,023 (which is incorporated herein by this reference in its entirety) describes a representative automated photography studio configured to capture a surround image. In various embodiments, a surround image capture procedure can be initiated on a mobile device (FIG. 2) via a software application.

While an automated photography studio may have preconfigured and/or hardwired connections between its components, other devices used to take surround images may begin unconnected and/or be unknown to one or more components of a surround image capture system. For example, various peripherals (e.g., a gimble, robotic arm, turntable, lighting, etc.) may need to be connected to a mobile device to be used in a surround image capture procedure This can be difficult when certain computer systems are used in a surround image capture procedure, as these computer systems often connect new peripherals using their own default software or software provided by the peripheral, both of which can be clunky and inefficient. For example, the default peripheral connecting software or connection software provided by the peripheral can require a user to exit surround image capture software or may only connect with previously connected peripherals.

Before beginning an image capture procedure of a surround image capture procedure, various peripherals (e.g., a gimble, robotic arm, turntable, lighting, etc.) may need to be paired. In various embodiments, both default pairing software or pairing software provided by the peripheral can be used to scan. In various embodiments, a pairing procedure can begin by scanning for available peripherals. This can be problematic when using wireless connectivity (e.g., Bluetooth, WiFi, etc) because a large number of pairable devices not used in a surround image capture procedure can be present and slow down a display of the scan results. To solve for this, a pairing procedure can filter out unused device manufacturers by their vendor ID (e.g., Bluetooth Vendor ID). In this way, only approved manufacturers will be shown when pairing a peripheral. In addition to allowing a display of pairable devices to be displayed quickly, this increases security of a surround image capture system. In various embodiments, a scan procedure when pairing can produce duplicate results. For example, if a device is registered by both default pairing software or pairing software provided by the peripheral, then two results (one from each piece of pairing software) can be returned. In response to this occurring, the duplicate results can be de-duplicated and a result from the pairing software provided by the peripheral can be shown. In this way, a display of pairable devices can be displayed quickly and a security of a surround image capture system can be increased.

After peripheral pairing is completed (if it is needed), an image capture procedure can begin. From a high level, an image capture procedure can involve capturing images from a variety of angles of the subject. For example, in the automated photography studio described above, a subject is rotated in front of a stationary camera and the camera captures a sequence of images as the subject rotates. When a mobile device is used, an image capture procedure can involve walking around a subject and capturing a plurality of images. A user can be directed in what directions to walk by the mobile device as they progress through the image capture procedure. For example, when an automobile is a subject of a surround image capture procedure, a photographer can be instructed to start by facing a left or right side of the automobile.

In various embodiments, method 100 can comprise an activity 102 of capturing a first portion of a surround image. In various embodiments, a first portion of a surround image capture procedure can use different setting than a remainder of an image capture procedure. For example, a first portion of a surround image can be captured at a higher quality than a remainder of the surround image. As another example, a first portion of a surround image can be captured at an increased frame rate and/or a higher number of photographs can be taken during a first portion of a surround image capture procedure. A first portion of a surround image capture procedure can last until a sufficient number of feature points have been recorded for downstream predictive algorithms to operate accurately. On as percentage-wise basis, a first portion of an image capture procedure can comprise 0-100% (i.e., 0° to 360°) of a surround image. In embodiments where an automobile is a subject, a first portion of an image capture procedure can end when a back or rear portion (e.g., trunk, hatch, brake lights, etc.) is shown in an image. In various embodiments, images captured in a first portion of a surround image can be used in downstream predictive algorithms to increase accuracy of the predictive model. Before a bounding box can be generated in activity 103, a capture procedure may instruct a user to move to a specific viewpoint. For example, if a user is facing the sun, they can be instructed to move to a viewpoint where the sun is not present in the frame.

In various embodiments, method 100 can comprise an activity 103 of generating a bounding box. In various embodiments, activity 103 can be performed concurrently and/or at the same time as activity 102. A bounding box can comprise any shape such as, for example, a rectangular and/or cuboid shaped enclosure surrounding a subject. A bounding box can represent a spatial extent and/or boundaries of a subject in 2D or 3D space. In various embodiments, a bounding box can be generated using a predictive algorithm. Generally speaking, a predictive algorithm can comprise an algorithm configured to predict a most likely bounding box when inputted with an image from a surround image capture procedure. In various embodiments, one or more images from a surround image capture procedure can be concatenated to form a vector, and this vector can be inputted into a predictive algorithm. A predictive algorithm can use anchor boxes to improve its accuracy. Anchor boxes are pre-defined bounding box shapes of various sizes and aspect ratios. The predictive algorithm can predict offsets from these anchor boxes to determine a most likely place for a bounding box. In various embodiments, a center of a bounding box can be used as an estimate for a center of a subject during a first portion of a surround image capture procedure. In this way, a motorized gimbal can be oriented towards a target during a first portion of a surround image and/or before sufficient feature points are gathered for downstream algorithms.

A predictive algorithm can comprise a neural network. Generally speaking, a neural network is a type of machine learning algorithm modeled after the structure and function of the human brain. A neural network can comprise layers of interconnected neurons. Data input into a neural network can be fed into a first layer and passed through multiple layers (e.g., hidden layers) of neurons. An output can be generated at a final layer. Each neuron in a neural network can apply a mathematical operation to data it receives before passing an output for that neuron to a subsequent neuron. In various embodiments, connections between neurons (known as synapses) have a weight that can be adjusted during training (described below). In this way, a performance of the neural network can be optimized. In various embodiments, training a neural network can comprise adjusting weights of synapses so that the network can accurately predict a where a bounding box should be placed.

In various embodiments, a convolutional neural network (CNN) can be used. Generally speaking, a CNN is a type of neural network designed to learn spatial hierarchies of features automatically and adaptively from input data. A CNN can comprise a convolutional layer, a pooling layer, a deconvolutional layer, and/or a fully connected layer. Convolutional layers perform feature extraction using a convolution operation, pooling layers downsample feature maps to reduce a size of data in the network (and thereby increase computational efficiency), deconvolutional layers upsample feature maps to improve further improve the network's ability to learn complex features, and fully connected layers can be used to produce an output of the network. In various embodiments, a convolutional layer can implement a type of mathematical operation called a convolution that extracts relevant features from input data. In various embodiments, a convolutional layer can perform convolutions on an image taken during an image capture procedure. A convolution can involve sliding a small matrix (referred to as a kernel or a filter) over input data and performing a dot product between the kernel and the input data. An output of a convolution can comprise a set of feature maps, each map representing a specific feature in the input image. A feature map can be passed through an activation function (e.g., a ReLU). An output of an activation function can be passed to a next node or layer in a CNN or output as a prediction by the CNN.

In various embodiments, activity 103 can comprise training a predictive algorithm. Training a predictive algorithm can comprise estimating internal parameters (e.g., synapse weights) of predictive model. In various embodiments, a predictive algorithm can be trained using labeled training data, otherwise known as a training dataset. A training dataset can comprise all or a part of images where a bounding box has been placed around a subject. In this way, a predictive algorithm can be trained to accurately place a bounding box. In various embodiments, a pre-trained predictive algorithm can be used, and the pre-trained algorithm can be re-trained on the training data. In various embodiments, the predictive algorithm can also consider both historical and dynamic input from previous surround images. In this way, a machine learning algorithm can be trained iteratively as additional data is added to a training data set. A predictive algorithm can be iteratively trained in real time as data is added to a training data set. In various embodiments, a predictive algorithm can be trained, at least in part, on a single subject's surround images or the single subject' surround images can be weighted in a training data set. In this way, a predictive algorithm tailored to a single subject can be generated. A predictive algorithm tailored to a single user can be used as a pre-trained algorithm for a similar user. Due to a large amount of data needed to create and maintain a training data set, a predictive algorithm can use extensive data inputs to make predictions. Due to these extensive data inputs, in various embodiments, creating, training, and/or using a predictive algorithm cannot practically be performed in a mind of a human being.

In various embodiments, method 100 can comprise an optional activity 104 of determining a 3D position of a camera. In various embodiments, activity 104 can be performed concurrently and/or as a part of activities 102-103. In other embodiments (e.g., when only a bounding box is being used), activity 104 can be skipped. As its name implies, a 3D position of a camera can comprise three one-dimensional points (e.g., x, y, and z). While signals like GPS can provide for a location of a captured image, these readings are not specific enough to be used in an automated gimbal system. Therefore, other techniques can be used to determine each of the three one-dimensional points.

A first one-dimensional point can be determined relative to a previous position of a camera. In other words, a position of camera used to take an image can be determined by comparing metadata between the two images. Each image taken in a surround image capture procedure can be tied to metadata associated with system settings, image settings, and location. Location for an image can be captured in a number of ways. For example, a location of a camera can be determined in a photobooth by knowing an elapsed rotation of a turntable that turns the camera and/or the subject. As another example, an accelerometer and/or gyroscope in a mobile device can be used to track a location of a camera using force exerted on the camera. At least one piece of metadata associated with an image can comprise a heading (otherwise known as yaw) of the camera. A heading for a subsequent image can be compared with a heading for a prior image, and, assuming that image capture procedure proceeds along a relatively circular path, a location of a camera along that path can be determined using a difference between the headings. An elapsed angle of rotation can also be determined using a difference in headings. For example, once a distance between two capture points is determined, the elapsed angle of rotation can be computed using trigonometric equations, functions, and/or operations. Angles of rotation for multiple points can be combined to determine a total elapsed angle of rotation for a surround image capture procedure.

A second and third one-dimensional point can be determined by first projecting a plane out of the camera. In various embodiments, the plane can bisect a subject after projection. A bounding box (either previously or concurrently generated) can be projected onto the subject. The points where the bounding box intersects with the projected plane can run approximately through a centerline of the subject. These points all have two one-dimensional points in common: the first one-dimensional point determined previously and a second one dimensional point determined by the intersection of the bounding box and the projected plane. A collection of third one-dimensional points can comprise a line running up from a bottom of the intersection to the top of the intersection.

As intersections between planes and bounding boxes are accumulated for images in a first portion of a surround image, a cloud of points that approximate a center of a subject is generated. Therefore, in various embodiments, method 100 can comprise an activity 105 of estimating a center of a subject. In various embodiments, activity 105 can be performed concurrently and/or as a part of activity 104. In various embodiments, an average of points in a cloud generated in activity 104 can be used. For example, a total for each of the first, second, and third one dimensional points can be summed and divided by a total number of points in the cloud. In various embodiments, a weighted average can be used. In various embodiments, less accurate portions of a point cloud can be weighted lower than more accurate points of a point cloud. For example, intersections where a camera is more perpendicular to a front, back, and/or side of a subject (e.g., a front, back, and/or side face of a car) are more accurate. While weightings are described as being lower and/or higher, it will be understood by a person having ordinary skill in the art that a lower weighted point will have less influence of an average than a higher weighted point.

A weighting for a point can increase as a camera captures more images. For example, a weighting for an estimated center point from an earlier captured image can be less than an estimated center point for a subsequently captured point. A perpendicularity of a camera can be used to weight an average. For example, a point that is more perpendicular to a subject can be weighted higher than a point that is less perpendicular to a subject. In an embodiment where an automobile is used as a subject, a perpendicular camera can capture images from a side and/or rear face of the automobile. In various embodiments, a mathematical function can be used to weight of a point. For example, trigonometric functions can be used to weight a point. The trigonometric function can be applied to a number of angles depending on how what type of weighting is desired. For example, trigonometric functions can be applied to a total elapsed angle to determine a weighting. As another example, trigonometric functions can be applied to a subset of angles determined as described in activity 104. A variety of trigonometric functions can be applied to an elapsed angle to create a weighting factor. For example, a sine function can be used to create a weighting factor that gives zero weight to an initial point (i.e., when an elapsed angle is 0°) and a maximum weight to a point with 90° of elapsed angle. As another example, a cosine function can be used to create a weighting factor that gives maximum weight to an initial point (i.e., an elapsed angle is 0°) and zero weight to a point with 90° of elapsed angle. In various embodiments, a trigonometric function can generate a negative value. In these embodiments, an absolute value of an output of the trigonometric function can be used. In this way, a more accurate center point can be determined by avoiding weightings that would reverse a sign of the estimated point and flip the estimated center below ground level. In various embodiments, a center can be estimated without using a cloud of points. For example, a center of a bounding box (e.g., one generated in activity 103) can be used as a center of a subject.

Figure 4:
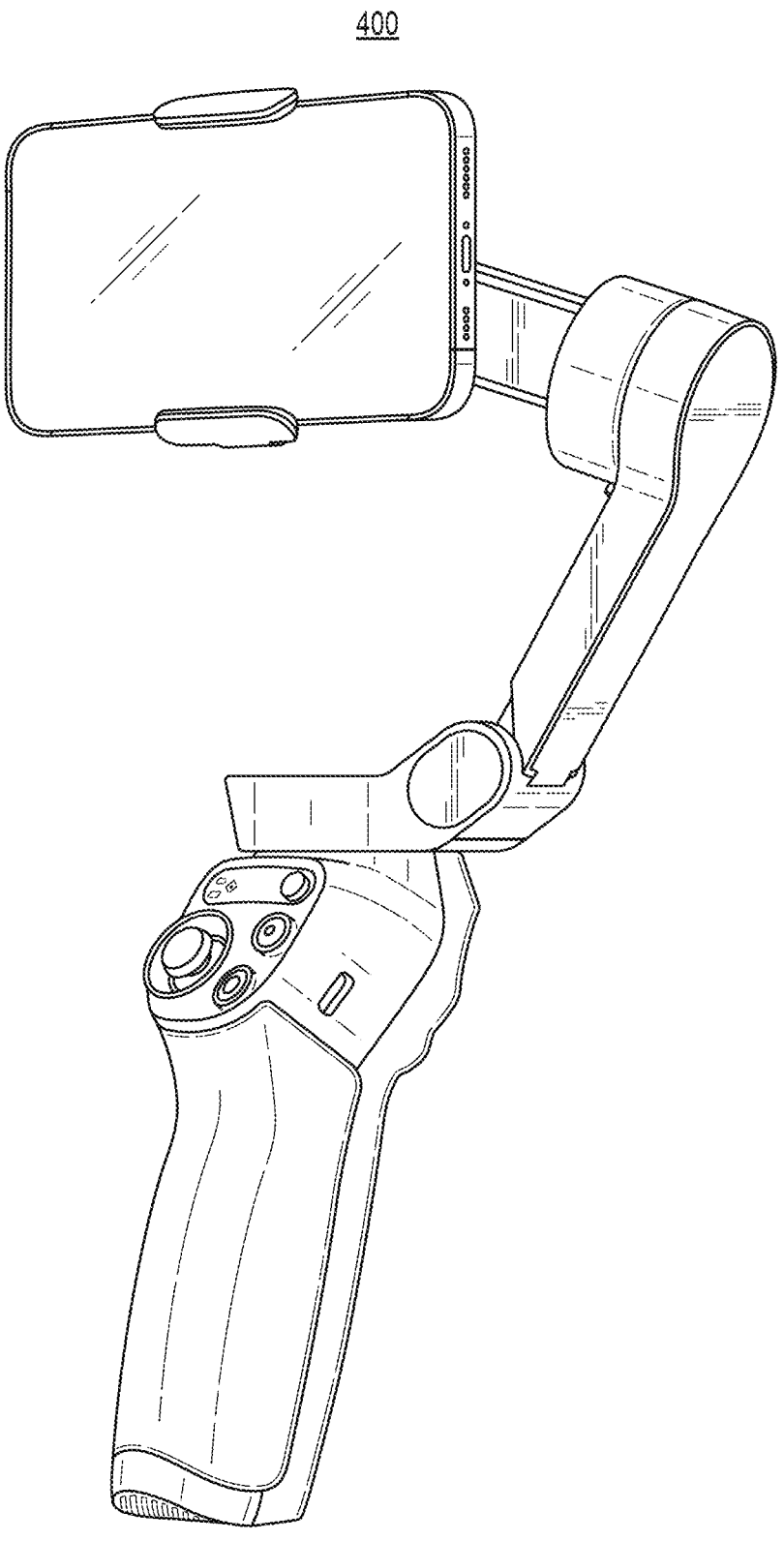
FIG. 4 illustrates a motorized gimbal, according to various embodiments.

In various embodiments, method 100 can comprise an activity 106 adjusting a position of a camera. In various embodiments, activity 106 can be performed concurrently and/or as a part of one or more activities 101-105. For example, activity 106 can be performed while additional images are captured and processed as described above. A position of a camera can be adjusted to focus on a center of a subject (e.g., as determined in activity 105 and/or a center of a bounding box generated in activity 103). In various embodiments, a 3D center point of a subject (e.g., one determined in activity 105) can be projected into a 2D point on a display of the image. A difference between a 2D center point (either the projection or the center of the bounding box) and a center of a display can be calculated. The gimbal (e.g., gimbal 400 (FIG. 4)) can be moved according to the difference to align the 2D center point and the center of the display.

In various embodiments, method 100 can comprise an optional activity 107 of capturing a new portion of a surround image. In various embodiments, activity 107 can be performed concurrently or as a part of activities 103-106. In various embodiments, activity 107 can be skipped (e.g., in response to a surround image capture sequence being completed). A surround image capture procedure can continue after activity 106 is completed. In these embodiments, additional images in the surround image can be captured and activities 105-107 can be repeated until a surround image capture procedure is completed. After an image capture procedure is completed, images captured can be stitched together into a surround image.

Loops of one or more of activities 105-107 can cause an automated gimbal to lag behind a user as they navigate around a subject due to the increased processing burden continual calculations create. This, in turn, can cause a low quality surround image to be generated. Gimbal lag can be corrected by moving an estimated center of mass by a predetermined number of pixels. In various embodiments, a center of mass can be moved in a same direction as a user. In these embodiments, a center of mass will only be moved in response to a user being in motion.

Turning ahead in the drawings, FIG. 2 illustrates a block diagram of a system 200 that can be deployed as an automated camera gimbal. System 200 is merely exemplary and embodiments of the system are not limited to the embodiments presented herein. System 200 can be employed in many different embodiments or examples not specifically depicted or described herein. In various embodiments, certain elements or modules of system 200 can perform various procedures, processes, and/or activities. In these or other embodiments, the procedures, processes, and/or activities can be performed by other suitable elements or modules of system 200.

Generally speaking, system 200 can be implemented with hardware and/or software. Part or all of the hardware and/or software implemented in system 200 can be conventional or part or all of the hardware and/or software can be customized (e.g., optimized) for implementing part or all of the functionality of system 200 described herein.

System 200 can include a web server 201, a surround image capture device 202, and/or an electronic device 203. Web server 201, surround image capture device 202, and/or electronic device 203 can each be a computer system, such as computer system 300 (FIG. 3), and can each be a single computer, a single server, a cluster or collection of computers or servers, or a cloud of computers or servers. A single computer system can also host each of two or more of web server 201, surround image capture device 202, and/or electronic device 203.

Surround image capture device 202 and electronic device 203 can be mobile electronic devices. A mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in various embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters.

Further, in these embodiments, a mobile electronic device can weigh less than or equal to 15.6 Newtons, 17.8 Newtons, 22.3 Newtons, 31.2 Newtons, and/or 44.5 Newtons.

Exemplary mobile electronic devices can comprise (i) an iPod®, iPhone®, iTouch®, iPad®, MacBook® or similar product by Apple Inc. of Cupertino, California, United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, California, United States of America, (ii) the Blackberry® operating system by Research In Motion (RIM) of Waterloo, Ontario, Canada, (iii) the Palm® operating system by Palm, Inc. of Sunnyvale, California, United States, (iv) the Android™ operating system developed by the Open Handset Alliance, (v) the Windows Mobile™ operating system by Microsoft Corp. of Redmond, Washington, United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). A wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch, smart ring, etc.). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, California, United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, New York, United States of America. In other specific examples, a head mountable wearable user computer device can comprise the Virtual Retinal Display™ product, or similar product by the University of Washington of Seattle, Washington, United States of America. Meanwhile, in further specific examples, a limb mountable wearable user computer device can comprise the iWatch™ product, or similar product by Apple Inc. of Cupertino, California, United States of America, the Galaxy Gear or similar product of Samsung Group of Samsung Town, Seoul, South Korea, the Moto 360 product or similar product of Motorola of Schaumburg, Illinois, United States of America, and/or the Zip™ product, One™ product, Flex™ product, Charge™ product, Surge™ product, or similar product by Fitbit Inc. of San Francisco, California, United States of America.

Figure 3:
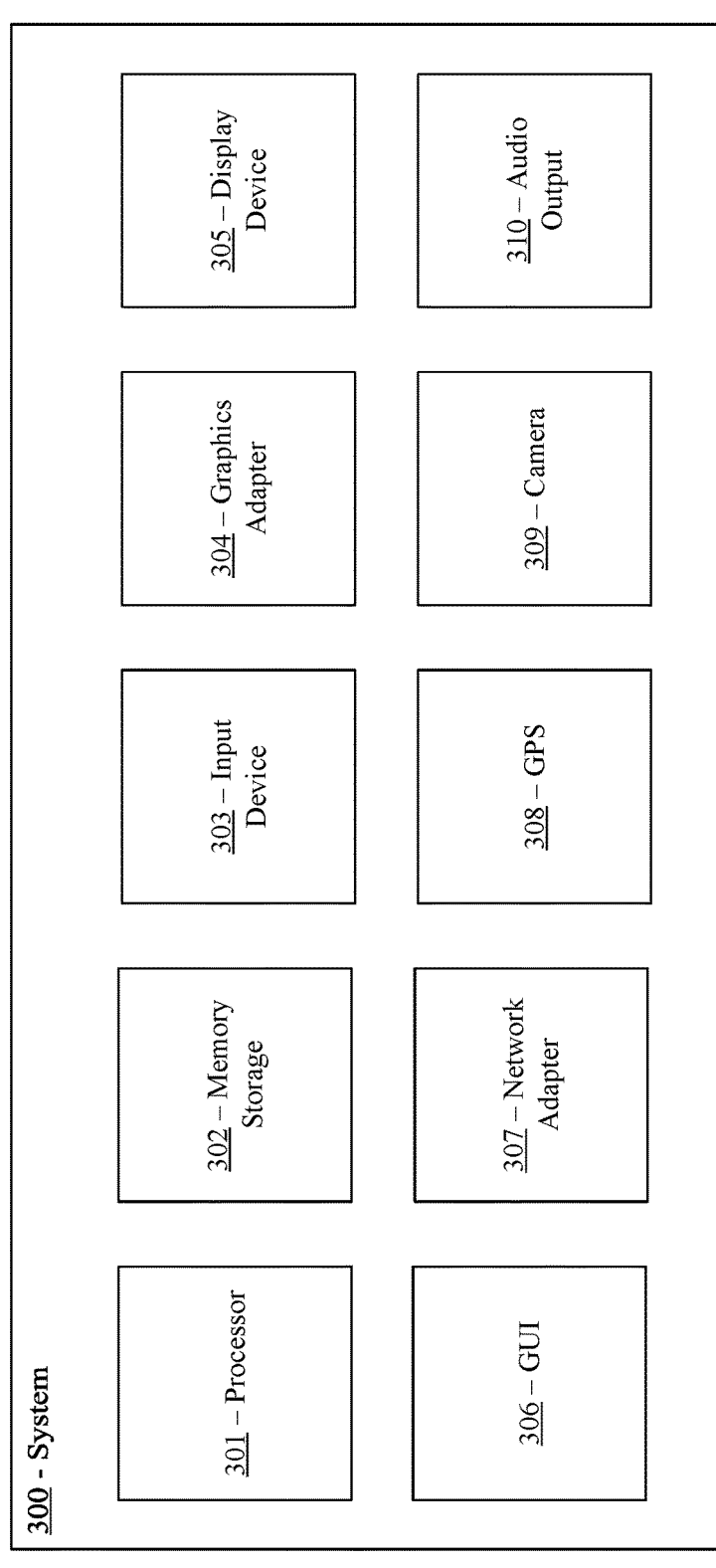
FIG. 3 illustrates a representative block diagram of a system, according to various embodiments.

Web server 201, surround image capture device 202, and/or electronic device 203 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to input device 303 (FIG. 3). Further, one or more of the display device(s) can be similar or identical to display device 305 (FIG. 3). The input device(s) and the display device(s) can be coupled to the processing module(s) and/or the memory storage module(s) of web server 201, surround image capture device 202, and/or electronic device 203 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In various embodiments, the KVM switch also can be part of web server 201, surround image capture device 202, and/or electronic device 203. In a similar manner, the processing module(s) and the memory storage module(s) can be local and/or remote to each other. Generally speaking, web server 201 can host one or more websites. For example, web server 201 can host an eCommerce website that allows users to browse and/or search for products and/or to purchase products, in addition to other suitable activities.

Web server 201, surround image capture device 202, and/or electronic device 203 can communicate or interface (e.g., interact) with one another through internet 220. Internet 220 can be an intranet that is not open to the public, a mesh network of individual systems, and/or a distributed system. Accordingly, in various embodiments, web server 201 and/or surround image capture device 202, and/or surround image capture device 202 (and/or the software used by such systems) can refer to a back end of system 200 operated by an operator and/or administrator of system 200, and electronic device 203 (and/or the software used by such systems) can refer to a front end of system 200 used by one or more customers. An operator and/or administrator of system 200 can manage system 200, the processing module(s) of system 200, and/or the memory storage module(s) of system 200 using the input device(s) and/or display device(s) of system 200.

Web server 201, surround image capture device 202, and/or electronic device 203 also can be configured to communicate with one or more databases. The one or more databases can comprise a product database that contains information about products, items, or SKUs (stock keeping units), VINs (vehicle identification numbers), vehicle makes, and/or vehicle models sold by a retailer. Data can be deleted from a database when it becomes older than a maximum age, which can be set by an administrator of system 200. Data collected in real-time can be streamed to a database for storage, thereby increasing a storage speed of a database.

The one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Further, the one or more databases can each be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s). In various embodiments, databases can be stored in a cache (e.g., MegaCache) for immediate retrieval on-demand. The one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, IBM DB2 Database, and/or NoSQL Database.

Meanwhile, communication between web server 201, surround image capture device 202, electronic device 203, and/or the one or more databases can be implemented using any suitable manner of wired and/or wireless communication. Accordingly, system 200 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In various embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

Turning ahead in the drawings, FIG. 3 illustrates a block diagram of a system 300 that can be employed as an automated gimbal, as described in greater detail below. System 300 is merely exemplary and embodiments of the system are not limited to the embodiments presented herein. System 300 can be employed in many different embodiments or examples not specifically depicted or described herein. In various embodiments, certain elements or modules of system 300 can perform various procedures, processes, and/or activities. In these or other embodiments, the procedures, processes, and/or activities can be performed by other suitable elements or modules of system 300.

Generally speaking, system 300 can be implemented with hardware and/or software. Part or all of the hardware and/or software implemented in system 300 can be conventional or part or all of the hardware and/or software can be customized (e.g., optimized) for implementing part or all of the functionality of system 300 described herein. When implemented as software, one or more elements of system 300 can be emulated (e.g., reproduced functionally and/or by action via software). For example, a virtual machine having one or more elements described below can be instantiated on one or more elements of system 200 (FIG. 2).

When implemented as hardware, one or more of the elements of system 300 can be coupled together using one or more chassis configured to hold one or more circuit boards and/or serial bus(es). These boards and buses allow the various elements of system 300 to communicate amongst each other to accomplish their intended purposes. While elements of system 300 are described below individually, each can also be integrated into one or more chassis, circuit boards, and/or buses of system 300. On the other hand, one or more elements of system 300 can also be removable (e.g., via a PCI slot on a motherboard and/or a USB port). One or more elements of system 300 may also be integrated and/or embedded in a different machine or manufacture. Although specific constructions of boards and buses within system 300 are not shown, it should be understood that their construction can be tied to a form factor selected for system 300.

System 300 can take a number of different form factors based on its implementation. For example, system 300 can be implemented as a desktop computer, a laptop computer, a mobile device, and/or a wearable device as described herein. Further, system 300 can comprise a single computer, a single server, a cluster or collection of computers or servers, or a cloud of computers or servers. Typically, a cluster or collection of servers can be used when the demand on 300 exceeds the reasonable capability of a single server or computer, when a distributed structure for system 300 is desired, and/or when parallel computing is desired.

In various embodiments, system 300 can comprise a processor 301, a memory storage 302, an input device 303, a graphics adapter 304, a display device 305, a graphical user interface (GUI) 306, a network adapter 307, a GPS 308, a camera 309, and/or an audio output 310. Processor 301 can comprise any type of computational circuit. For example, processor 301 can comprise a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, application specific integrated circuits (ASICs), etc. Processor 301 can be configured to implement (e.g., run) computer instructions (e.g., program instructions)

stored on memory devices in system 300. At least a portion of the program instructions, stored on these devices, can be suitable for carrying out at least part of the techniques and methods described herein. Architecture and/or design of processor 301 can be compliant with any of a variety of commercially distributed architecture families. Processor 301 can be configured to perform parallel computing in combination with other elements of system 300 and/or additional processors. Generally speaking, parallel computing can be seen as a technique where multiple elements of system 300 are used to perform calculations simultaneously. In this way, complex and repetitive tasks (e.g., training a predictive algorithm) can be performed faster and with less processing power than without parallel computing.

Memory storage 302 can comprise non-volatile memory (e.g., read only memory (ROM)) and/or volatile memory (e.g., random access memory (RAM)). The non-volatile memory can be removable and/or non-removable non-volatile memory. Meanwhile, RAM can comprise dynamic RAM (DRAM), static RAM (SRAM), or some other type of RAM. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), or some other type of ROM. Memory storage 302 can comprise non-transitory memory and/or transitory memory. All or a portion of memory storage 302 can be referred to as memory storage module(s) and/or memory storage device(s). Memory storage 302 can have a number of form factors when used in system 300. For example, memory storage 302 can comprise a magnetic disk hard drive, a solid state hard drive, a removable USB storage drive, a RAM chip, etc.

Memory storage 302 can be encoded with a wide variety of computer code configured to operate system 300. For example, portions of memory storage 302 can be encoded with a boot code sequence suitable for restoring system 300 to a functional state after a system reset. As another example, portions of memory storage 302 can comprise microcode such as a Basic Input-Output System (BIOS) operable with elements of system 300. Further, portions of the memory storage 302 can comprise an operating system (e.g., a software program that manages the hardware and software resources of a computer and/or a computer network). The BIOS can be configured to initialize and test components of system 300 and load the operating system. Meanwhile, the operating system can perform basic tasks such as, for example, controlling and allocating memory, prioritizing the processing of instructions, controlling input and output devices, facilitating networking, and/or managing files. Exemplary operating systems can comprise software within the Microsoft® Windows®, Mac OS®, Apple® iOS®, Google® Android®, UNIX®, and/or Linux® series of operating systems.

Input device 303 can be configured to allow a user to interact and/or control elements of system 300. A number of devices and be used as input device 303 alone or in combination. For example, input device 303 can comprise a keyboard, a mouse, a touch screen, a microphone, a camera, etc. Input device 303 can be coupled to other elements of system 300 in a number of ways. For example, input device 303 can be coupled via a Universal Serial Bus (USB) port in a wired and/or wireless manner or via a specialized port (e.g., a PS/2 port) depending on the specific device. User inputs through input device 303 can come in a number of forms. For example, when input device 303 comprises a microphone, user input can be received via voice commands and/or a speech to text algorithm. As another example, when input device 303 comprises a camera, user input can be received via bodily movements that are captured and interpreted by system 300.

Graphics adapter 304 can be configured to receive and/or generate one or more elements for display on display device 305. Exemplary embodiments of graphics adapter 304 can comprise devices within the NVIDIA® GeForce® and/or the AMD® RX® series of video cards. In various embodiments, a chipset present on graphics adapter 304 can be configured to perform similar, simultaneous computations in a manner more efficient than other chipsets. For example, rendering a 3D scene on graphics adapter 304 can involve repeated geometric calculations performed in parallel to generate the 3D scene. As another example, repeated mathematical calculations involved in training a predictive algorithm can be performed in parallel on graphics adapter 304 more efficiently than on processor 301. Display device 305 can receive and display signals from graphics adapter 304. A number of devices can be used as display device 305. For example, display device 305 can comprise a computer monitor, a television, a touch screen display, a heads up display (HUD) medium, etc.

In various embodiments, display device 305 can optionally display graphical user interface (GUI) 306. GUI 306 can be a part of and/or displayed by surround image capture device 202 and/or electronic device 203. With regards to form, GUI 306 can comprise text and/or graphics (image) based user interfaces. For example, GUI 306 can comprise a heads up display (HUD). When GUI 306 comprises a HUD, GUI 306 can be projected onto a medium (e.g., glass, plastic, metal, etc.), displayed in midair as a hologram, and/or displayed on display device 305. GUI 306 can be color, black and white, and/or greyscale. GUI 306 can be implemented as an application running on a computer system, such as image capture device 202 and/or electronic device 203. GUI 306 can also comprise a website accessed through a network (e.g., internet 220). For example, GUI 306 can comprise an eCommerce website and/or a surround image capture software. When GUI 306 allows for modification and/or changes to one or more settings in system 300, it can be referred to as an administrative (e.g., back end) GUI. GUI 306 can also be displayed as or on a virtual reality (VR) and/or augmented reality (AR) system or display. GUI 306 can receive a number of interactions from a user via input device 303. For example, an interaction with a GUI can comprise a click, a look, a selection, a grab, a view, a purchase, a bid, a swipe, a pinch, a reverse pinch, etc.

Network adapter 307 can be configured to connect system 300 to a computer network by wired communication (e.g., a wired network adapter) and/or wireless communication (e.g., a wireless network adapter). Network adapter 307 can be integrated into one or more chassis, circuit boards, and/or buses or be removable (e.g., via a PCI slot on a motherboard). For example, network adapter 307 can be implemented via one or more dedicated communication chips configured to receive various protocols of wired and/or wireless communications.

GPS 308 can comprise a chipset and/or module configured to communicate with a satellite based location system configured to provide location and time information. (e.g., GPS 230). This location and time information can be used to determine a location of system 300. Camera 309 can comprise a digital video and/or still image camera. Camera 309 can be integrated into a gimbal and/or a mobile device. Audio output 310 can be configured to receive and/or generate one or more audio signals for play through a speaker. Exemplary audio outputs 310 can comprise an audio card.

Although an automated camera gimbal has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-3 may be modified, and that the foregoing discussion of certain of these embodiments does not necessarily represent a complete description of all possible embodiments. For example, one or more of the procedures, processes, or activities of FIG. 1 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
    one or more processors; and
    one or more non-transitory computer-readable storage devices storing computing instructions configured to run on the one or more processors and cause the one or more processors to perform:
        capturing a first portion of a surround image using a camera;
        generating a bounding box using an image in the first portion of the surround image;
        estimating a center of an item in the image using the bounding box;
        determining a 3D position of the camera using metadata of the first portion of the surround image; and
        adjusting a position of a motorized gimbal such that the motorized gimbal orients the camera towards the center of the item.

2. The system of claim 1, wherein the first portion of the surround image comprises approximately one quarter of the surround image.

3. The system of claim 1, wherein the capturing of the first portion of the surround image is at a higher frame rate than a remainder of the surround image.

4. The system of claim 1, wherein the generating the bounding box comprises using a predictive algorithm to generate the bounding box.

5. The system of claim 1, wherein the estimating the center of the item comprises using a weighted average of 3D points comprising the center of the bounding box.

6. The system of claim 5, further comprising determining a 3D point corresponding to the center of the bounding box using a 3D position of the camera.

7. The system of claim 1, wherein the computing instructions are further configured to cause the one or more processors to perform filtering a list of pairable peripherals by a vendor ID.

8. A method comprising:

capturing a first portion of a surround image using a camera;

generating a bounding box using an image in the first portion of the surround image;

estimating a center of an item in the image using the bounding box; and determining a 3D position of the camera using metadata of the first portion of the surround image; and adjusting a position of a motorized gimbal such that the motorized gimbal orients the camera towards the center of the item.

9. The method of claim 8, wherein the first portion of the surround image comprises approximately one quarter of the surround image.

10. The method of claim 8, wherein the capturing of the first portion of the surround image is at a higher frame rate than a remainder of the surround image.

11. The method of claim 8, wherein the generating the bounding box comprises using a predictive algorithm to generate the bounding box.

12. The method of claim 8, wherein the estimating the center of the item comprises using a weighted average of 3D points comprising the center of the bounding box.

13. The method of claim 12, further comprising determining a 3D point corresponding to the center of the bounding box using a 3D position of the camera.

14. The method of claim 8, further comprising filtering a list of pairable peripherals by a vendor ID.

15. An article of manufacture comprising a non-transitory, tangible computer readable storage medium having instructions stored thereon that, in response to execution by a computer based system, cause the computer based system to perform operations comprising:

capturing a first portion of a surround image using a camera;

generating a bounding box using an image in the first portion of the surround image;

estimating a center of an item in the image using the bounding box; and determining a 3D position of the camera using metadata of the first portion of the surround image; and adjusting a position of a motorized gimbal such that the motorized gimbal orients the camera towards the center of the item.

16. The article of manufacture of claim 15, wherein the first portion of the surround image comprises approximately one quarter of the surround image.

17. The article of manufacture of claim 15, wherein the capturing of the first portion of the surround image is at a higher frame rate than a remainder of the surround image.

18. The article of manufacture of claim 15, wherein the generating the bounding box comprises using a predictive algorithm to generate the bounding box.

19. The article of manufacture of claim 15, wherein the estimating the center of the item comprises using a weighted average of 3D points comprising the center of the bounding box.

20. The article of manufacture of claim 15, wherein the instructions cause the computer based system to perform further operations comprising filtering a list of pairable peripherals by a vendor ID.

* * * * *